US008873884B2

(12) United States Patent
Bauchot et al.

(10) Patent No.: US 8,873,884 B2
(45) Date of Patent: Oct. 28, 2014

(54) METHOD AND SYSTEM FOR RESIZING AN IMAGE

(75) Inventors: Frederic Bauchot, Saint-Jeannet (FR); Denis Jean-Pierre Esteve, Vence (FR); Stephane Garcia, La Gaude (FR); Gerard Marmigere, Drap (FR)

(73) Assignee: International Business Machines Corporation, Armonk, NY (US)

( * ) Notice: Subject to any disclaimer, the term of this patent is extended or adjusted under 35 U.S.C. 154(b) by 894 days.

(21) Appl. No.: 12/898,755

(22) Filed: Oct. 6, 2010

(65) Prior Publication Data

US 2012/0087582 A1 Apr. 12, 2012

(51) Int. Cl.
G06K 9/32 (2006.01)
G06K 9/00 (2006.01)
G06T 3/40 (2006.01)

(52) U.S. Cl.
CPC .................................. *G06T 3/4084* (2013.01)
USPC .......................................... 382/298; 382/167

(58) Field of Classification Search
None
See application file for complete search history.

(56) References Cited

U.S. PATENT DOCUMENTS

| 5,774,598 | A  | * | 6/1998  | Sunshine et al. ............... 382/250 |
| 5,832,120 | A  |   | 11/1998 | Prabhakar et al. |
| 5,845,015 | A  | * | 12/1998 | Martucci ....................... 382/250 |
| 6,002,809 | A  | * | 12/1999 | Feig et al. ..................... 382/298 |
| 6,215,916 | B1 | * | 4/2001  | Acharya ....................... 382/298 |
| 6,718,064 | B1 | * | 4/2004  | Abe ............................. 382/232 |
| 6,807,310 | B1 | * | 10/2004 | Dugad et al. .................. 382/248 |
| 7,146,055 | B2 |   | 12/2006 | Jia |
| 7,676,106 | B2 | * | 3/2010  | Panusopone et al. ......... 382/250 |
| 2004/0076334 | A1 | * | 4/2004 | Kang ............................ 382/250 |
| 2005/0069224 | A1 | * | 3/2005 | Nowicki et al. ............... 382/298 |
| 2007/0252850 | A1 |   | 11/2007 | Fujiwara et al. |
| 2008/0298699 | A1 | * | 12/2008 | Yu et al. ....................... 382/250 |
| 2009/0263011 | A1 | * | 10/2009 | Shi et al. ...................... 382/159 |

FOREIGN PATENT DOCUMENTS

WO 2004004314 A1 1/2004

OTHER PUBLICATIONS

Zhiming Liu et al., "Fusion of the complementary Discrete Cosine Features in the YIQ color space for face recognition", Journal: Computer Vision and Image Understanding, vol. 111, Issue 3, 2008, pp. 249-262.

* cited by examiner

*Primary Examiner* — Stephen R Koziol
*Assistant Examiner* — Sean Conner
(74) *Attorney, Agent, or Firm* — Maeve McCarthy; Douglas Lashmit

(57) ABSTRACT

There is disclosed a method and system for resizing a digital image wherein a RGB image is converted into an YCbCr image (Y, Cb, Cr planes). Thereafter, a discrete cosine transform (DCT), followed by a specific inverse cosine transform (IDCT) is performed on each row/column of the Y, Cb, Cr planes. The mentioned specific operation corresponds to a type of homothetic matrix, which dimensions are defined by a scaling factor. In order to produce a scaled image, the scaled Y, Cb, Cr images are transformed to an RGB image for display.

14 Claims, 5 Drawing Sheets

METHOD AND SYSTEM FOR RESIZING AN IMAGE

FIELD OF THE INVENTION

The present invention generally relates to data processing, and more particularly to systems and methods for image processing.

BACKGROUND ART

An increase or decrease in the size of digital images is often required. Increasing the size of a picture is required when, for example, it is desirable to obtain large prints. The quality of the scaling method then directly defines the quality of printed materials. Further, displaying a picture comprising a high number of pixels (12 megapixels for example) on a screen with limited features (a display of 2 megapixels for example, 6 times less) also requires better methods to reduce the size of a given picture by trying to keep the initial picture accuracy.

Today an image size can be changed in several ways. Considering the objective of doubling the size of a given image (dimensions or surface), the state of the art proposes several approaches. The easiest way of doubling an image's size is nearest-neighbor interpolation, where every pixel is replaced with four pixels of the same color. The resulting image is larger than the original, and preserves all the original detail, but has undesirable jaggedness. The diagonal lines, for example, may show the characteristic "stairway" shape (aliasing). Other scaling methods are better at preserving smooth contours in the image. For example, bilinear interpolation produces the better results. Linear (or bilinear, in two dimensions) interpolation is typically better than the nearest-neighbor system for changing the size of an image, but causes some undesirable softening of details and can still be somewhat jagged. Better scaling methods today include bicubic interpolation. This kind of method leverages block prediction and this implies drawbacks. With a large resizing for example, the image appears to be blurred.

Another method is to use fractal analysis of the image, but it requires huge computing resources. In conclusion, current methods do not allow to increase more than a factor two a given picture size without visible defaults or artifacts.

U.S. Pat. No. 7,146,055 entitled "Image processing decompression apparatus and method of using same different scaling algorithms simultaneously" discloses a data decompression apparatus, comprising: a decompression unit for providing separated full resolution luminance and chrominance color space components indicative of individual image pixels in a compressed color space data stream; a plurality of image processing units for applying a scaling process to the full resolution luminance color space components and for applying another scaling process to the individual ones of the chrominance color space components to provide decompressed full resolution luminance and chrominance color space data to facilitate image zoom operations. This approach is not sufficient.

In order to address these and other problems, there is a need for an enhanced method of resizing an image.

SUMMARY OF THE INVENTION

In order to address these and other problems, the present invention provides a method and system for resizing a digital image.

There is provided a method of resizing a digital image comprising n columns and m rows of pixels; the method comprising: multiplying a first squared matrix (n by n) corresponding to a discrete periodic function decomposition by each row vector (n by 1) to generate a respective intermediate vector (n by 1), wherein each row of the digital image corresponds to each respective row vector; multiplying a second non-squared matrix by each intermediate vector (n by 1) to generate a respective modified row vector (n*s1 by 1), the second matrix corresponding to an inverse periodic function matrix (n*s1 by n); wherein s1 is a first scaling factor and wherein the respective modified row vector (n*s1 by 1) corresponds to a respective modified row of the digital image.

This stretches or shrinks the image along one dimension (for example the x-axis), according to a first scaling factor. In a further step, the other dimension is modified (for example the y-axis), with the same method and according to a second scaling factor s2. This further step may operate on the result of the first step (or on an initial image; if s1 equals 1 for example).

In more detail, the method further includes: multiplying a third squared matrix (m by m) corresponding to a discrete periodic function decomposition by each column vector (m by 1) of the modified digital image to generate a respective intermediate vector (m by 1); wherein each column of the digital image corresponds to each respective column vector; (d) multiplying a fourth non-squared matrix by each intermediate vector (m by 1) to generate a respective modified column vector (m*s2 by 1), the fourth matrix corresponding to an inverse periodic function matrix (m*s2 by m); wherein s2 is a second scaling factor and wherein the respective modified column vector (m*s2×1) corresponds to a respective modified column of the digital image.

The correspondence of rows and columns of the digital image with row vectors and column vectors is direct but may also be indirect: in this case, the expression designates an association or a mapping or a transformation, comprising operations such as conversion or modification operations.

The new image is thus of dimensions (x*s1, y*s2) or (x*s1, y) or (x, y*s2). The (final or intermediate) digital image may be rotated clockwise or counter clockwise also. Symmetries can be performed. In a particular case s1 equals s2.

In an embodiment, the discrete periodic function decomposition is a Discrete Cosine Transform (DCT) transform, but other decompositions are thoroughly possible (discrete Fourier transform or DFT; discrete wavelet transform or DWT; etc.). It is also recommended to handle separately each of the three Y, Cb and Cr components of the YCbCr format, before an RGB conversion and RGB image display An advantage is to enable the enlargement or reduction of a given picture while conserving the maximum of initial accuracy and quality.

Another advantage is to predict missing pixels in a picture by spatial/frequency transformation of complete rows and complete columns.

Still another advantage is to allow a resizing transformation without "blocks", artifacts or other aliasing effects.

Further advantages of the invention will become clear to the skilled person upon examination of the drawings and detailed description. It is intended that any additional advantages be incorporated therein.

BRIEF DESCRIPTION OF THE DRAWINGS

Embodiments of the invention will now be described with reference to the following drawings.

Figure 1:
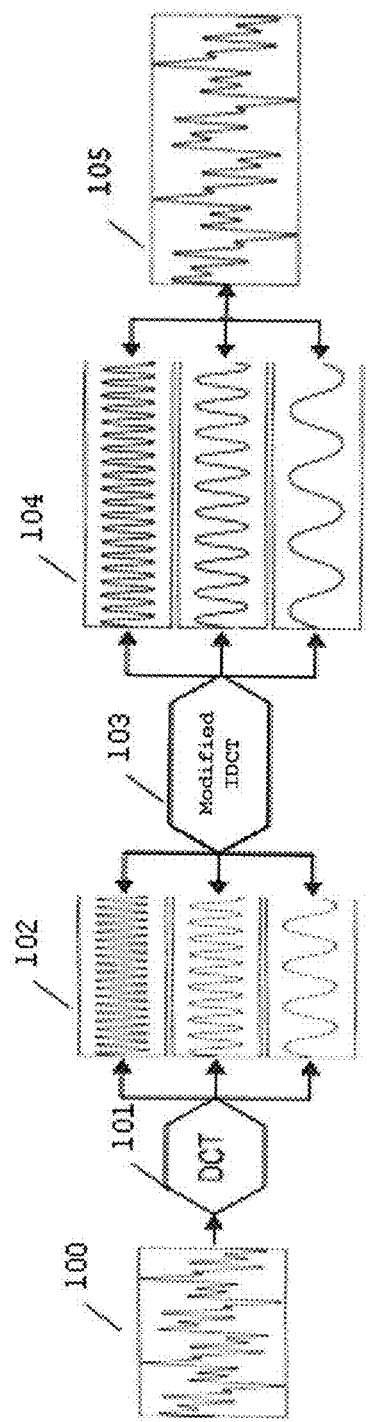
FIG. 1 shows the general principle of the invention.

To facilitate description, any numeral identifying an element in one figure will represent the same element in any other figure.

DETAILED DESCRIPTION OF THE INVENTION

The following text presents embodiments in the context of digital imaging and in particular photography but it is to be understood that it is not limited to this specific context or environment. It extends equally to any type of content (such as books, comics, paintings, etc.) or environments (such as eBooks, multimedia devices, smartphones, 3D and immersive environments, augmented reality environments, etc.), for all kinds of purposes (such as education, research, industry, museums, health care, etc.) and with various human-machine interfaces (such as mice, digital pens, multi-touch screens, haptics, etc.). Embodiments of the invention provide useful teachings and imply interesting applications in the aforementioned domains.

In digital imaging, a pixel (picture element) is a single point in a raster image. In computing, an image composed of pixels is known as a bitmapped image or a raster image. Each pixel is a sample of an original image (scan, sampling from analog source, photo sensors, etc.). A pixel is generally thought of as the smallest single component of a digital image. Pixels are most of the time in a 2D grid or array or matrix. They are represented using dots or squares. A square corresponds to equal horizontal and vertical sampling pitch; however, a pixel does not need to be rendered as a tiny square. Alternative ways of constructing an image from a set of pixel values involve using dots, lines, or rectangles (as in video systems). The number of pixels in an image is sometimes called the resolution. The more samples, the better the accuracy. The intensity of each pixel is variable; in color systems, each pixel has typically three components such as red, green, and blue (RGB). The number of distinct colors which can be represented by a pixel depends on the number of bits per pixel (bpp). For example, a value of 8 bpp designates 256 colors. The present description provides values for this range (component color depth of 8, 8:8:8 coding). It is clear that embodiments of the invention shall not be restricted to these particular values, which are provided by way of example only. Much enhanced values may be used (those corresponding to highcolors or truecolors for example)

The disclosed method leverages several remarkable aspects which will be later discussed: (a) handling of entire rows or columns of the digital image; (b) use of modified periodic function decomposition; (c) optional use of particular color working space; and (d) optional further processing for optimization purposes.

The present invention operates on rows (or lines or horizontals) of the digital image. More precisely it operates on complete rows and columns, i.e., complete rows or complete columns are handled and processed. The present invention considers (and manipulates) images as collections of rows and columns. For decades, traditional solutions in JPEG or JPEG2000 have been considering "squared" or "rectangular" image blocks of small dimensions, such as 4×4 or 8×8 pixels. This "block" paradigm, due to past memory and processing power limitations, has not been challenged since then. Nowadays, applying "1D" periodic function decomposition and analysis leverages and is rendered possible by more powerful processors and faster volatile memory. For example, a 6 MP (6 megapixels) image comprising 3000 points in a row would required computations on at least (3000×3000) matrixes according to the invention multiplied by the number of rows of the digital image (about 3000). This results in quite high demanding hardware requirements.

It appears that using "1D" decomposition avoids continuity effects and issues observed when scaling images with methods working with "2D" decompositions (squared image blocks).

Embodiments of the invention also boast a particular matrix handling, by applying a matrix "morphism" operation by multiplying dimensions of the matrix by a chosen scaling factor. Certain embodiments use a certain type of periodic function decomposition.

Various optimizations for accelerating processing time and producing satisfying visual renderings are also disclosed herewith.

Such above features taken in combination produce visual results which have been concretely assessed as being much better than with existing methods.

FIG. 1 shows the general principle of the invention.

FIG. 1 illustrates different steps or elements for a modification performed on a signal.

As a signal, the invention considers (entire) rows (or entire columns) of the digital image. Each row of the digital image is modified according to the method: the image is stretched or shrunk along one dimension. When all rows have been modified, the modified image may be modified again (if necessary): each column is then modified according to the described method. In conclusion, both dimensions of the image have been successively modified. In other words, the method illustrated in FIG. 1 is iterated on each row and on each column of the digital image (for example, it is iterated over the m rows of the digital image). According to a first embodiment, rows of the digital image are first transformed and then are columns. According to a second embodiment, the opposite can happen (first columns, then rows). The resulting images are not necessarily the same. It is a valuable solution to interpolate the two corresponding images, in order to generate an "average" image.

The modification brought to the signal uses discrete periodic function decomposition. As discrete periodic function decomposition algorithms, embodiments of the present invention use a discrete cosine transform. A discrete cosine transform (DCT) expresses a signal in terms of a sum of cosine functions oscillating at different frequencies. The inverse of DCT, the type-III DCT, is often called simply "the inverse DCT" or "the IDCT". The DCT has a strong "energy compaction" property: most of the signal information tends to be concentrated in a few low-frequency components of the DCT. It is noticeable that such DCT transformations are linear (this is important for continuity reasons). In particular, the function can be represented as a matrix and the DCT (III) matrix is orthogonal. In linear algebra, an orthogonal matrix is a square matrix with real entries whose columns (or rows) are orthogonal unit vectors. Its transpose is equal to its inverse: this accelerates data processing in particular. More precisely, the invention uses DCT type III.

As depicted in FIG. 1, a DCT transform 101 modifies a first signal by periodic function decomposition at step 102. The first signal may be an entire row or entire column of the digital image. It may then be considered as a vector. In linear algebra, a row vector or row matrix is a 1×n matrix, that is, a matrix consisting of a single row. A particular and original operation is then performed at step 103. The vector obtained by discrete periodic function decomposition is multiplied by a modified inverse periodic function decomposition. Namely, the modified Inverse DCT matrix (IDCT) has the same number of columns but more or less rows. This latter number is driven by the desired output. A scaling factor is thus defined, which rules the number of lines of the modified IDCT matrix. The result of the multiplication at step 104 of the vector by the modified matrix is converted into a modified signal at step 105.

It is noted that it is thoroughly possible to use other types of DCT or other periodic function decomposition methods. The use of DCT fastens processing time and produces good visual results when implemented in the disclosed method.

Figure 2:
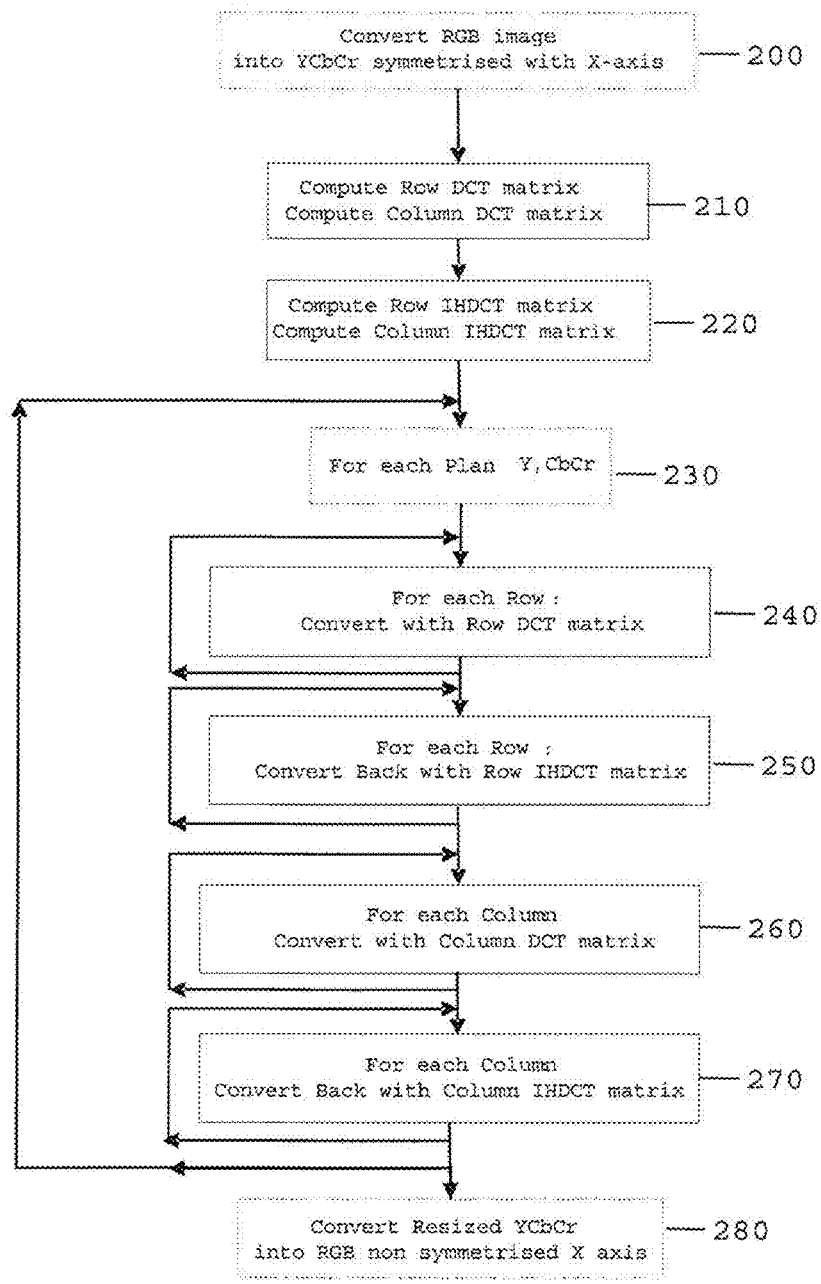
FIG. 2 shows a workflow of the method.

FIG. 2 shows a workflow of the method.

Steps 200 and 280 (YCbCr working space and symmetry) are fully optional and will be discussed with regard to FIG. 3.

At steps 210 and 220 there are computed DCT matrixes and IDCT matrixes, respectively. These matrixes will be intensively used later.

At step 230 the method iterates over the three chosen different Y-Cb-Cr planes.

At step 240, each complete row of the image is transformed, for a given component (Y, Cb and Cr), into Cosine Frequency values using Discrete Cosine Transform (DCT).

Then these values are divided or multiplied by the scaling factor, and the Inverse Cosine Transform (IDCT) is applied on these new values at step 250.

At step 260 and 270, the same transformations are applied but column by column.

More details on each step are now provided.

At step 210, there is computed the row DCT matrix according the initial number of pixels per row: Ni=initial number of pixels per row $$M_{DCT} = \begin{bmatrix} M_{0,0} & M_{1,0} & \ldots & M_{i,0} & \ldots & M_{Ni-1,0} \\ M_{0,1} & M_{1,1} & \ldots & M_{i,1} & \ldots & M_{Ni-1,1} \\ \vdots & \vdots & \vdots & \vdots & \vdots & \vdots \\ M_{0,j} & M_{1,j} & \ldots & M_{i,j} & \ldots & M_{Ni-1,j} \\ \vdots & \vdots & \vdots & \vdots & \vdots & \vdots \\ M_{0,Ni-1} & M_{1,Ni-1} & \ldots & M_{i,Ni-1} & \ldots & M_{Ni-1,Ni-1} \end{bmatrix}$$

with $$M_{i,j} = \cos\left[\frac{\pi(2j+1)i}{2N_i}\right]$$

The column DCT matrix at step 210 is computed according to the same formula, wherein:
Ni is the initial number of pixels per column At step 220, there is computed the row inverse homothetic DCT matrix according to the initial and target numbers of pixels per row, wherein:
Ni is the initial number of pixels per row and
Nt is the target number of pixels per row $$Nt = Ni^* \text{ first scaling factor } (s1)$$

$$\overline{M}_{IHDCT} = \begin{bmatrix} \overline{M}_{0,0} & \overline{M}_{1,0} & \ldots & \overline{M}_{i,0} & \ldots & \overline{M}_{Ni-1,0} \\ \overline{M}_{0,1} & \overline{M}_{1,1} & \ldots & \overline{M}_{i,1} & \ldots & \overline{M}_{Ni-1,1} \\ \vdots & \vdots & \vdots & \vdots & \vdots & \vdots \\ \overline{M}_{0,j} & \overline{M}_{1,j} & \ldots & \overline{M}_{i,j} & \ldots & \overline{M}_{Ni-1,j} \\ \vdots & \vdots & \vdots & \vdots & \vdots & \vdots \\ \overline{M}_{0,Ni-1} & \overline{M}_{1,Ni-1} & \ldots & \overline{M}_{i,Nt-1} & \ldots & \overline{M}_{Ni-1,Nt-1} \end{bmatrix}$$

with $$\overline{M}_{i,j} = \alpha(i)\cos\left[\frac{\pi(2j+1)i}{2N_t}\right]$$

and $$\alpha(i) = \begin{cases} \sqrt{\dfrac{1}{N_i}} & \text{for } i = 0 \\ \sqrt{\dfrac{2}{N_i}} & \text{for } i \neq 0 \end{cases}$$

The dimensions of the matrix have changed (still Ni columns but Nt rows). A matrix morphism operation has been performed. In other words, one of the dimensions of the considered matrix has changed. The modified IDCT matrix has the same number of columns that the DCT matrix had, but the number of rows of the matrix has increased (or decreased) depending on the desired scaling operation. There are more rows in the matrix if the image has to be scaled up; there are fewer rows in the matrix if the image has to be scaled down.

Similarly, the modified column inverse DCT matrix according to the same formula above is also computed, with Ni=initial number of pixels per column and
Nt=target number of pixels per column
Nt=Ni* second scaling factor (s2)

At step 240, each row of each plane [Y(j=0, 1, ... Ni−1), then Cb, then Cr] is converted to the frequency domain by using the row DCT matrix: C(i=0, 1, ... Ni−1)=converted row, Ni=initial number of pixels per row $$C(i) = \alpha(i) \times \sum_{j=0}^{Ni-1} \overline{Y}(j) \times M_{dct}(i,j)$$

with $$\alpha(i) = \begin{cases} \sqrt{\dfrac{1}{Ni}} & \text{for } i = 0 \\ \sqrt{\dfrac{2}{Ni}} & \text{for } i \neq 0 \end{cases}$$

At step 250 occurs a conversion back to the frequency domain of resized row of each plane Y, then Cb, then Cr, by using the row inverse homothetic DCT matrix: Y(j=0, 1 ... Nt), then Cb(j) then Cr(j)=resized row, Ni=initial number of pixels per row and Nt=target number of pixels per row=Ni*first scaling factor (s1)

$$\overline{Y}(j) = \sum_{i=0}^{Ni-1} C(i) \times \overline{M}_{ihdct}(i,j)$$

At step 260 and 270, analogous steps are applied to each column (of each plane Y, Cb, Cr) with the second scaling factor.

At step 280, the image may be optionally converted back to the initial color space RGB (see FIG. 3).

To conclude, it is observed that the scaling operation (up or down) of the row (or of the column) is performed during the inverse DCT (IDCT) operation. Each pixel of the row is thus part of a vector. The dimensions of the inverse matrix are increased or decreased in order to obtain the desired modified row size. It may be considered as a magnifying effect; the precision of the inverse transformation is enhanced or lowered. The target number of pixels drives such effect. In periodic function decomposition other than this IDCT, the input size and the output size are identical. Thus a feature of the invention resides in the fact of increasing or decreasing the number of the output parameters, by increasing or decreasing the level of precision.

FIG. 3 illustrates a matrix and resizing operations.

Figure 3A:
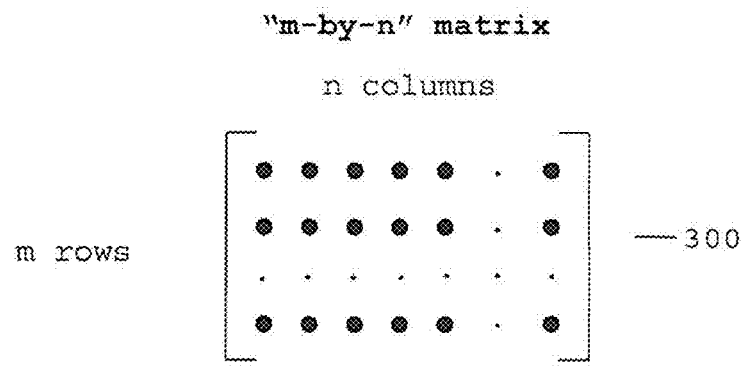
FIG. 3 illustrates a matrix and resizing operations.

FIG. 3a presents the terminology: an (m by n) matrix is a matrix comprising m rows and n columns.

Figure 3B:
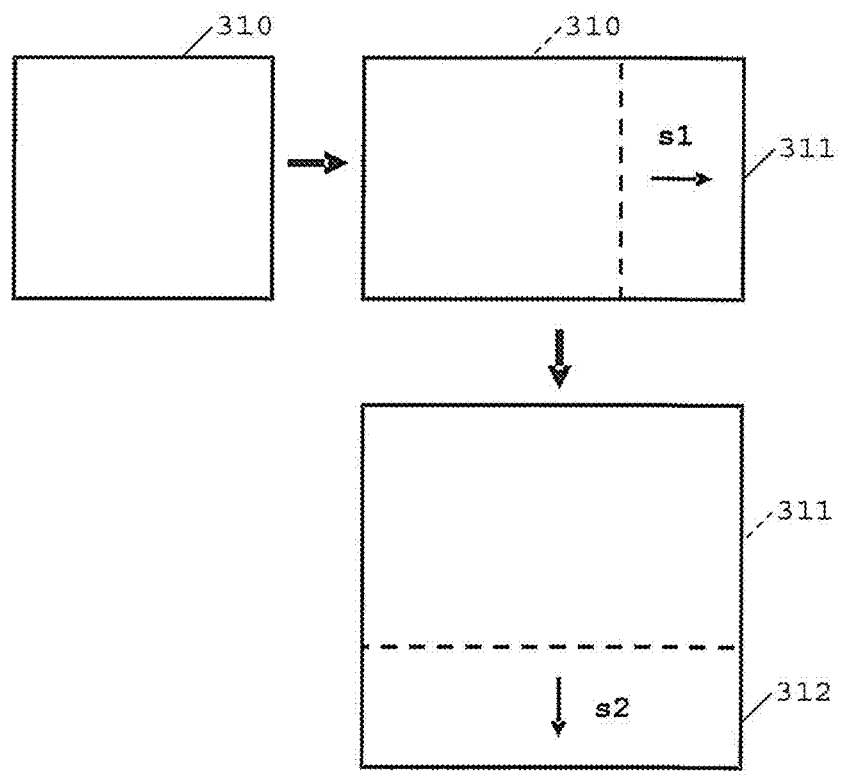

FIG. 3b provides an example of resizing operations. FIG. 3b shows three digital images, 310 to 312. The first digital image is the initial one. The digital image 311 has been resized according to a first scaling factor s1 along the X-axis, while the image 312 shows a further resizing operation along the Y-axis according to a second scaling factor s2.

A scaling factor corresponds to any number (non null): natural, real, computable, etc.

Figure 4:
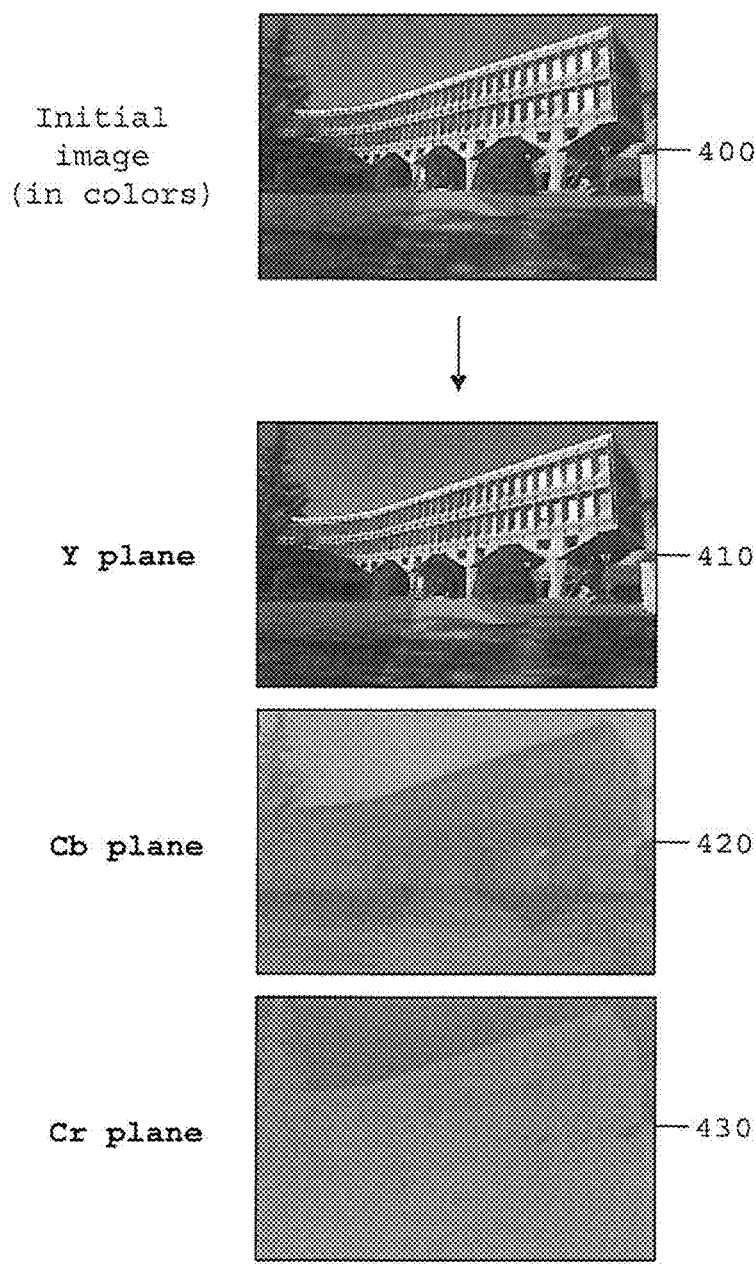
FIG. 4 shows the Y, Cb and Cr planes of an image.

FIG. 4 illustrates an optional YCbCr working space.

The YCbCr working space is completely optional. Other planes than YCbCr may be considered in the method. For example, it is possible to work directly in RGB. By way of example, FIG. 3 illustrates and discusses these YCbCr components.

YCbCr is a family of color spaces used as a part of the color image pipeline in digital photography systems. Y is the luminance component and Cb and Or are the blue-difference and red-difference chroma components. The human eye is less sensitive to chrominance than luminance. Compression algorithms can take advantage of this phenomenon and subsample the values of Cb and Cr without significant visual degradation of the original color signal. On computers, color information is recorded as red-green-blue signal (RGB). YCbCr is sometimes abbreviated to YCC and YUV corresponds to YCbCr. Terms Y'UV, YUV, YCbCr, YPbPr, etc., do not restrict the scope of the invention.

Image 400 is the initial picture (in colors). Image 410 shows the Y component plane. Image 420 shows the Cb component plane. Image 430 shows the Cr component plane.

After many tests, it appears that performing the disclosed method on YCbCr images produce the best results. In other words, the method will also work on other formats (such as RBG directly, or else) but the best mode or the preferred embodiment corresponds to the YCbCr space. It has been reported that working directly in RGB mode produces artifacts and color shifts (in particular on frontiers). Working in YCbCr/YUV produces better results because of the cosine transformation operation.

In the example, the conversion RGB-YCbCr follows (where 1 byte coding per component—0 to 255 per color Red, Green or Blue):

$$\begin{pmatrix} Y \\ \overline{C}_b \\ \overline{C}_r \end{pmatrix} = \frac{1}{256} \begin{pmatrix} 65.738 & 129.057 & 25.064 \\ -37.945 & -74.494 & 112439 \\ 112439 & -94.154 & -18.285 \end{pmatrix} \begin{pmatrix} R \\ G \\ B \end{pmatrix} + \begin{pmatrix} 16 \\ 128 \\ 128 \end{pmatrix}$$

The reverse conversion follows:

$$\begin{pmatrix} R \\ G \\ B \end{pmatrix} = \frac{1}{256} \begin{pmatrix} 298.082 & 0 & 408.583 \\ 298.082 & -100.291 & -208.120 \\ 298.082 & 516.412 & 0 \end{pmatrix} \begin{pmatrix} Y \\ \overline{C}_b \\ \overline{C}_r \end{pmatrix} + \begin{pmatrix} -222.921 \\ 135.576 \\ -276.836 \end{pmatrix}$$

In addition, the inventors have reported that symetrizing each YCbCr pixel value with zero in view to have symmetric curves with the X-Axis (range −127;128 range instead of range 0;255) is valuable for the speed of execution of algorithms.

Figure 5:
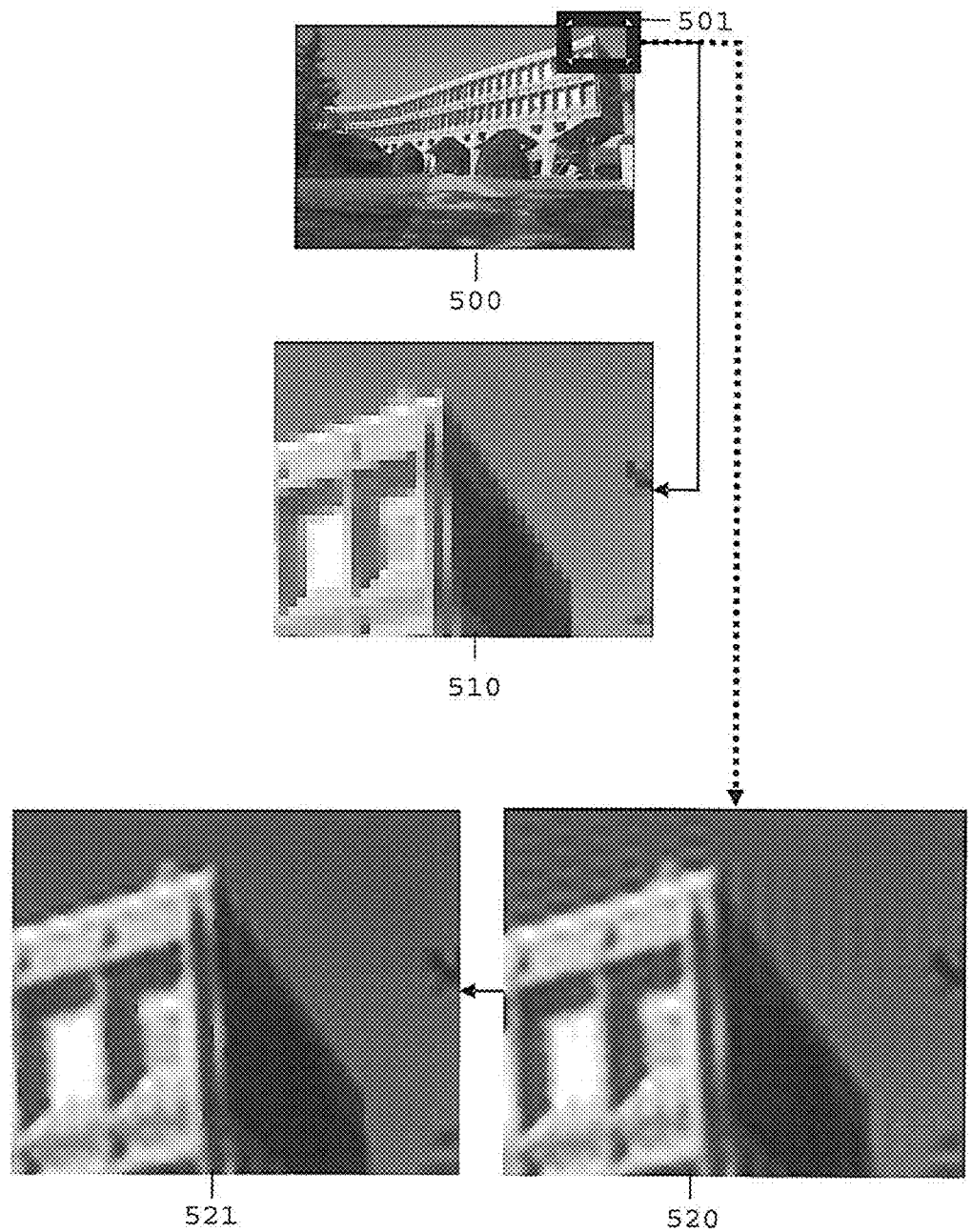
FIG. 5 shows visual details of an image resized according to the method.

FIG. 5 shows visual details of an image resized according to the method.

FIG. 5 shows an image 500, in which a subpart 501 is highlighted. The image 500 is resized (and following the subpart is resized too) according to two different methods. Image 510 shows the standard result of a resizing operation of the image 501. Image 520 shows the result according to certain embodiments of the invention. Image 521 shows the result of a further processing handled on the image 520.

As shown in the images in FIG. 5, image 510 generated according to existing methods presents aliasing. Most of the time, photo editor programs correct this aliasing by means of specific algorithms, which produce blurred images. These out of focus images look smooth but lack accuracy or "piqué". The image 520 generated according to embodiments of the invention does not present such aliasing. It does show other artifacts, looking like undulations in the sky. This is due because of flat tints or solid colors which end up generating visual undulations (periodic function decomposition). To correct this effect, inventors first detect uniforms areas in images to be handled. Thresholds may be used (for example on a pattern of 5 contiguous pixels) in order to determine uniform areas. Obtained areas are not modified according to the disclosed present invention, to the contrary of the rest of the digital image. The obtained uniforms areas are scaled up or down using classic interpolation techniques. The rest of the image is modified according to the present invention. Masking techniques or additive techniques then enable to assemble or generate the final image. The example in the FIG. 5 shows this correction: image 520 is corrected into image 521.

Embodiments of the invention are not restricted to still images. The term "image" also designates frames of a video, including high definition videos. For example, these images may represent captures of 3D environments or human-machine interfaces.

Scaling operations (increase or decrease of the dimensions of an image) may vary. Transformations can be performed statically or dynamically, selectively or for the whole image, and the like (a combination thereof).

For example, transformations may be selectively applied: some subparts of an image may be scaled according different factors while other subparts of the image remain unchanged. The term "image" in claims designates a whole image or alternatively the subpart of an existing image.

Described transformations may be applied continuously (in a zoom effect or operation) or applied discretely (with thresholds, pitch, etc).

Described operations on images can be iteratively performed (successively in time, in real-time, etc). In particular, scaled (up or down) videos can be obtained by iterating the disclosed method over time and image frames.

The scaling factor may be predefined according to many parameters: type of device and in particular dimensions of the screen display, visualization conditions, computation time and latency requirements, psycho visual models and measured or estimated attention of the user, placement in the global vision of the user, etc.

Different scaling factors may be used. In particular, a first scaling factor may be used for operations related to rows while a second and different scaling factor may be used for operations related to columns. A particular case would correspond to the case wherein the first scaling factor equals the second scaling factor. Different scaling factors may also be used; these parameters being defined as a function of rows or columns properties (image may be distorted but further corrections may be brought).

The invention can take the form of an entirely hardware embodiment, an entirely software embodiment or an embodiment containing both hardware and software elements. In an embodiment, the invention is implemented in software, which includes but is not limited to firmware, resident software, microcode, etc. In particular it will be appreciated that the functionality of many of the components or method steps may be implemented by means of software, hardware or firmware of any combination of these. In a high performance system, a hardware implementation may prove advantageous (for processing time) for example.

Furthermore, the invention can take the form of a computer program product accessible from a computer-usable or computer-readable medium providing program code for use by or in connection with a computer system or any instruction execution system. For the purposes of this description, a computer-usable or computer readable medium can be any apparatus that can contain, store, communicate, or transport the program for use by or in connection with the instruction execution system, apparatus, or device.

The invention claimed is:

1. A method of resizing a digital image comprising n columns and m rows of pixels, the method comprising:
   generating a first modified image by:
   (a) modifying a row of the digital image by a discrete periodic function decomposition to generate a respective row vector (m by 1), wherein each row of the digital image corresponds to each respective row vector; and
   multiplying each row vector (m by 1) by a modified inverse periodic function decomposition to generate a respective modified row vector (m*s1 by 1);
   wherein s1 is a first scaling factor and wherein the respective modified row vector (m*s1 by 1) corresponds to a respective modified row of the digital image; and
   (b) modifying a column of the digital image by a discrete periodic function decomposition-to generate a respective column vector (n by 1); wherein each column of the digital image corresponds to each respective column vector; and
   multiplying each column vector (n by 1) by a modified inverse periodic function decomposition to generate a respective modified column vector (n*s2 by 1);
   wherein s2 is a second scaling factor and wherein the respective modified column vector (n*s2 by 1) corresponds to a respective modified column of the digital image;
   generating a second modified image by:
   (a) modifying a column of the digital image by a discrete periodic function decomposition-to generate a respective column vector (n by 1); wherein each column of the digital image corresponds to each respective column vector; and
   multiplying each column vector (n by 1) by a modified inverse periodic function decomposition to generate a respective modified column vector (n*s2 by 1);
   wherein s2 is a second scaling factor and wherein the respective modified column vector (n*s2 by 1) corresponds to a respective modified column of the digital image; and
   (b) modifying a row of the digital image by a discrete periodic function decomposition to generate a respective row vector (m by 1), wherein each row of the digital image corresponds to each respective row vector; and
   multiplying each row vector (m by 1) by a modified inverse periodic function decomposition to generate a respective modified row vector (m*s1 by 1);
   wherein s1 is a first scaling factor and wherein the respective modified row vector (m*s1 by 1) corresponds to a respective modified row of the digital image; and
   interpolating the first modified image and the second modified image to generate a third image.

2. The method of claim 1, wherein the digital image includes a component plane Y, Cb or Cr.

3. The method of claim 2, wherein each value of Y, Cb or Cr pixel is symmetrized with zero.

4. The method of claim 2, further comprising:
   generating an image in a YCbCr format and converting the generated YCbCr image in a RGB color space.

5. The method of claim 4, further comprising:
   displaying the RGB image on a user interface.

6. The method of claim 1, wherein the second scaling factor equals the first scaling factor.

7. A computer readable storage device storing a computer program, for resizing a digital image comprising n columns and m rows of pixels, when executed on a computing device, the computer program comprising instructions for:
   generating a first modified image by:
   (a) modifying a row of the digital image by a discrete periodic function decomposition to generate a respective row vector (m by 1), wherein each row of the digital image corresponds to each respective row vector; and
   multiplying each row vector (m by 1) by a modified inverse periodic function decomposition to generate a respective modified row vector (m*s1 by 1)
   wherein s1 is a first scaling factor and wherein the respective modified row vector (m*s1 by 1) corresponds to a respective modified row of the digital image; and
   (b) modifying a column of the digital image by a discrete periodic function decomposition to generate a respective column vector (n by 1); wherein each column of the digital image corresponds to each respective column vector; and
   multiplying each column vector (n by 1) by a modified inverse periodic function decomposition to generate a respective modified column vector (n*s2 by 1);
   wherein s2 is a second scaling factor and wherein the respective modified column vector (n*s2 by 1) corresponds to a respective modified column of the digital image;
   generating a second modified image by:
   (a) modifying a column of the digital image by a discrete periodic function decomposition to generate a respective column vector (n by 1); wherein each column of the digital image corresponds to each respective column vector; and multiplying each column vector (n by 1) by a modified inverse periodic function decomposition to generate a respective modified column vector (n*s2 by 1);

wherein s2 is a second scaling factor and wherein the respective modified column vector (n*s2 by 1) corresponds to a respective modified column of the digital image; and (b) modifying a row of the digital image by a discrete periodic function decomposition to generate a respective row vector (m by 1), wherein each row of the digital image corresponds to each respective row vector; and multiplying each row vector (m by 1) by a modified inverse periodic function decomposition to generate a respective modified row vector (m*s1 by 1)

wherein s1 is a first scaling factor and wherein the respective modified row vector (m*s1 by 1) corresponds to a respective modified row of the digital image; and interpolating the first modified image and the second modified image to generate a third image.

8. The computer program of claim 7, wherein the digital image includes a component plane Y, Cb or Cr.

9. The computer program of claim 8, wherein each value of Y, Cb or Cr pixel is symmetrized with zero.

10. The computer program of claim 8, further comprising instructions for:

generating an image in a YCbCr format and converting the generated YCbCr image in a RGB color space.

11. The computer program of claim 10, further comprising instructions for:

displaying the RGB image on a user interface.

12. The computer program of claim 7, wherein the second scaling factor equals the first scaling factor.

13. A computer system for resizing a digital image comprising n columns and m rows of pixels, the computer system comprising:

at least one computing processor;
at least one computer-readable storage device;
program instructions stored on the at least one computer-readable storage device for execution by at least one computing processor, the program instructions comprising the method steps of:
generating a first modified image by:
(a) modifying a row of the digital image by a discrete periodic function decomposition to generate a respective row vector (m by 1), wherein each row of the digital image corresponds to each respective row vector; and
multiplying each row vector (m by 1) by a modified inverse periodic function decomposition to generate a respective modified row vector (m*s1 by 1);

wherein s1 is a first scaling factor and wherein the respective modified row vector (m*s1 by 1) corresponds to a respective modified row of the digital image; and (b) modifying a column of the digital image by a discrete periodic function decomposition-to generate a respective column vector (n by 1); wherein each column of the digital image corresponds to each respective column vector; and multiplying each column vector (m by 1) by a modified inverse periodic function decomposition to generate a respective modified column vector (n*s2 by 1);

wherein s2 is a second scaling factor and wherein the respective modified column vector (n*s2 by 1) corresponds to a respective modified column of the digital image;

generating a second modified image by:

(a) modifying a column of the digital image by a discrete periodic function decomposition-to generate a respective column vector (n by 1); wherein each column of the digital image corresponds to each respective column vector; and multiplying each column vector (m by 1) by a modified inverse periodic function decomposition to generate a respective modified column vector (n*s2 by 1);

wherein s2 is a second scaling factor and wherein the respective modified column vector (n*s2 by 1) corresponds to a respective modified column of the digital image; and (b) modifying a row of the digital image by a discrete periodic function decomposition to generate a respective row vector (m by 1), wherein each row of the digital image corresponds to each respective row vector; and multiplying each row vector (m by 1) by a modified inverse periodic function decomposition to generate a respective modified row vector (m*s1 by 1);

wherein s1 is a first scaling factor and wherein the respective modified row vector (m*s1 by 1) corresponds to a respective modified row of the digital image; and interpolating the first modified image and the second modified image to generate a third image.

14. The method of claim 1, further comprising:

determining a uniform area of the third image, based, at least in part, on a threshold number of pixels;

creating a subpart of the third image, wherein the subpart includes the uniform area;

determining not to modify the subpart of the third image.

* * * * *